US006851905B2

(12) United States Patent
Manfred

(10) Patent No.: US 6,851,905 B2
(45) Date of Patent: Feb. 8, 2005

(54) SELF-LOCKING THREADED ELEMENT

(75) Inventor: Jakob Manfred, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 63 days.

(21) Appl. No.: 10/319,702

(22) Filed: Dec. 12, 2002

(65) Prior Publication Data

US 2003/0147719 A1 Aug. 7, 2003

(30) Foreign Application Priority Data

Dec. 12, 2001 (DE) .......................... 101 61 026

(51) Int. Cl.⁷ .................... E16B 39/22; E16B 39/28
(52) U.S. Cl. .................. 411/286; 411/285; 411/288; 411/290; 411/291; 411/433
(58) Field of Search ................. 411/432, 433, 411/291, 290, 286, 285, 288

(56) References Cited

U.S. PATENT DOCUMENTS

| | | | | |
|---|---|---|---|---|
| 171,898 A | * | 1/1876 | Wiles .......................... | 411/286 |
| 609,144 A | * | 8/1898 | Goddin ........................ | 411/236 |
| 1,448,952 A | * | 3/1923 | Briese et al. ................ | 411/286 |
| 2,391,712 A | * | 12/1945 | King et al. .................... | 470/19 |
| 2,409,204 A | * | 10/1946 | Gall ............................. | 188/74 |
| 2,421,254 A | * | 5/1947 | Froelich ..................... | 403/197 |
| 2,472,421 A | * | 6/1949 | Hamill et al. ................. | 403/21 |
| 2,952,289 A | * | 9/1960 | Kreidel et al. .............. | 411/290 |
| 3,939,889 A | * | 2/1976 | Bereznicki .................. | 411/322 |
| 3,994,207 A | * | 11/1976 | Ekdahl et al. ................ | 92/29 |
| 5,907,983 A | * | 6/1999 | Spirer ........................ | 81/53.2 |
| 5,915,902 A | * | 6/1999 | Patterson et al. ........... | 411/291 |
| 2002/0098057 A1 | * | 7/2002 | HOffmann et al. ......... | 411/344 |

FOREIGN PATENT DOCUMENTS

| | | | |
|---|---|---|---|
| DE | 1149578 | 3/1963 | |
| FR | 850193 | 12/1939 | |
| FR | 950562 | 9/1949 | |
| JP | 3-9111 | * 1/1991 | ......... F16B/39/286 |

* cited by examiner

Primary Examiner—Robert J. Sandy
Assistant Examiner—Katherine Mitchell
(74) Attorney, Agent, or Firm—Sidley Austin Brown & Wood, LLP

(57) ABSTRACT

A self-locking threaded element that is used, for example, in a tool receptacle of a grinding tool. The self-locking threaded element comprises a retaining member (1) and a main part (3) axially disposed relative to the retaining member (1) at a distance (a) and connected with the retaining member (1) by a connection web (2). The main part (3) and the retaining member (1) are interspersed with a thread (4) for engaging a counter-thread. The retaining member (1) is displaceable relative to the main part (3), at least in the longitudinal direction (L) of the thread (4), to provide a self-locking threaded element that is inexpensive to manufacture and enables both simple tightening and loosening of the threaded element.

4 Claims, 2 Drawing Sheets

SELF-LOCKING THREADED ELEMENT

BACKGROUND OF THE INVENTION

The invention relates to a self-locking threaded element with a retaining member and a main part disposed at an axial interval to the retaining member and connected therewith by a connecting web, wherein the main part and the retaining part are interspersed with a thread for engagement into a counter-thread.

Self-locking threaded elements of the type described above are used in many areas. For example, the threaded element is configured as a nut member with an internal thread that co-operates with a threaded pin with a counter-thread. Particularly, the threaded element is advantageously self-locking in the dynamic loading of the threaded connection.

DE 40 034 445 discloses a self-locking threaded element comprising a retaining member and a main part disposed at an axial interval to the retaining member and connected therewith by a connecting web. The main part and the retaining member are interspersed with a thread for engaging in a counter thread. The retaining member is, for example, formed resiliently by weak points in the material so that loosing of the threaded connection between the thread and counter-thread results in a gripping of both elements.

The drawback in the known solution is that a loosening of the threaded connection is very costly to the user.

SUMMARY OF THE INVENTION

The object of the present invention is to provide a self-locking threaded element that is inexpensive to manufacture and that enables simple tightening and loosening of the threaded element.

This object is achieved according to the invention by a retaining member that is displaceable at least in the longitudinal direction of the thread relative to the main part.

Locking and loosening of the threaded element is assured by virtue of the fact that the retaining member is displaceable relative to the main part. In a locked state, the threaded element is locked against loosening; in the unlocked state, however, it is rather simple for the user to loosen the threaded element from the counter thread.

Such a configured threaded element finds application in a tool receptacle for clamping a tool in a motor-driven driver spindle, for example. The threaded element according to the invention, when configured as a nut, co-operates with a counter thread disposed on the driver spindle and clamps the tool against a flange that is fixedly disposed on the driver spindle. In this application of the threaded element, an undesired loosening of the threaded element from the driver spindle is prevented by the self-locking threaded element.

The retaining member preferably pivots, in the longitudinal direction of the thread, relative to the main part to effect a locking and unlocking of the threaded element. Advantageously, the connecting web thereby acts as an articulation between the retaining part and the main part. A further embodiment comprises, for example, a resiliently formed retaining member. Naturally, a translatory movement of the retaining member relative to the main part is also possible, but this embodiment is more costly to manufacture.

Preferably, an expansion element is provided for pivoting the retaining member relative to the main part to assure an actionable locking of the threaded element from the outside, in particular, independent of whether the threaded element is rotated in the tightening direction or in the loosening direction.

The expansion element is advantageously at least partially arranged between the main part and the retaining element to assure the most compact construction.

The expansion element preferably comprises a bolt-like expansion part that serves to move the retaining member towards the main part.

Advantageously, the expansion part runs transverse to the longitudinal direction of the thread, in particular producing a clamping of the threaded element, to move the retaining member in a structurally simple fashion in the longitudinal direction of the thread by actuating the expansion part.

Preferably, the expansion part can be rotated transverse to the longitudinal direction of the thread to effect the movement of the retaining member towards the main part by a rotational movement of the expansion part.

In particular, a rotational movement of the expansion part results in a movement and hence a wedging of the threaded element by virtue of the fact that the expansion part advantageously exhibits a non-rounded cross-section.

In an advantageous embodiment, the expansion element comprises an actuation part for rotating the expansion part to create an easy utilization form of the threaded element.

The main part, the retaining member and the connection web are formed in one piece. In a further advantageous embodiment the expansion element is formed in one piece to provide for inexpensive manufacture of the threaded element.

BRIEF DESCRIPTION OF THE INVENTION

The preferred exemplary embodiment invention is explained more completely below with reference to the following drawings, wherein.

DETAILED DESCRIPTION OF THE INVENTION

Figure 1:
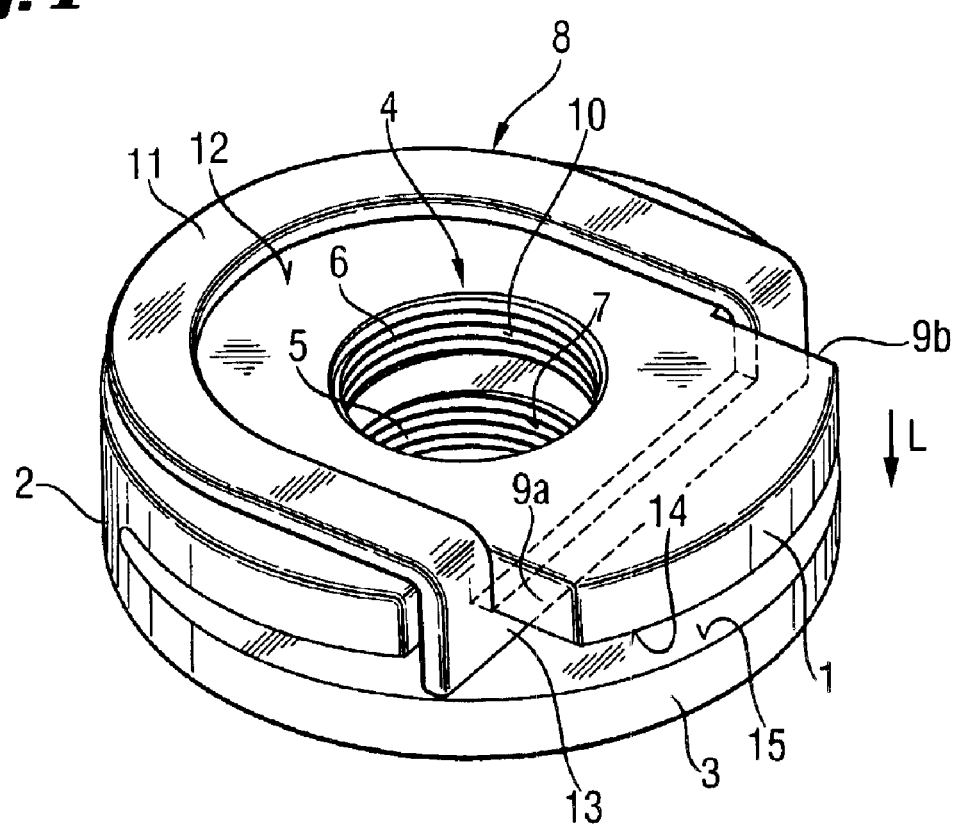
FIG. 1 shows a perspective view of a self-locking threaded element, in the locked state, according to the invention.
Figure 2:
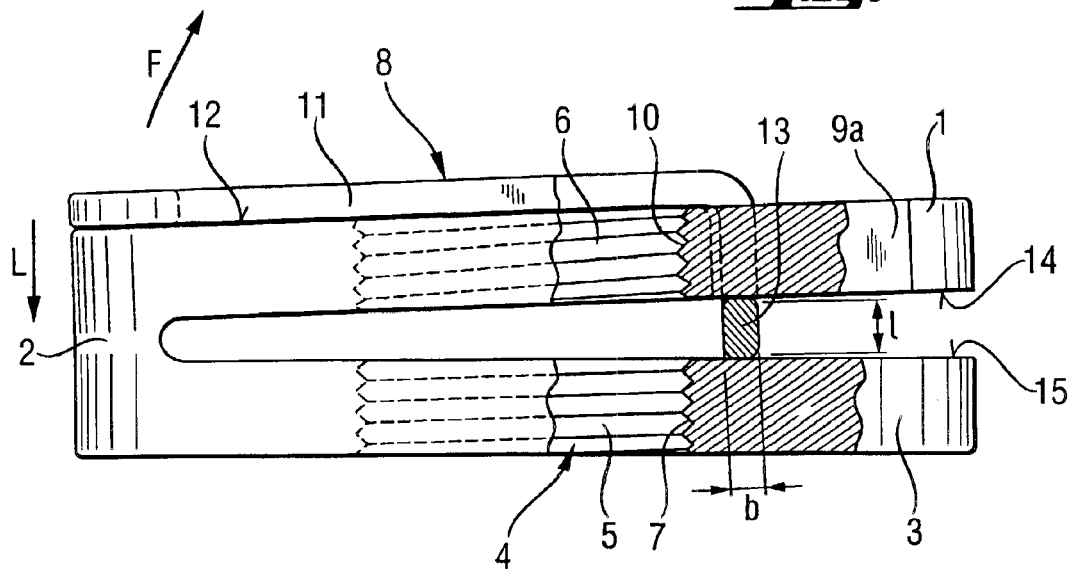
FIG. 2 shows a side view of the threaded element of FIG. 1 in the locked state.
Figure 3:
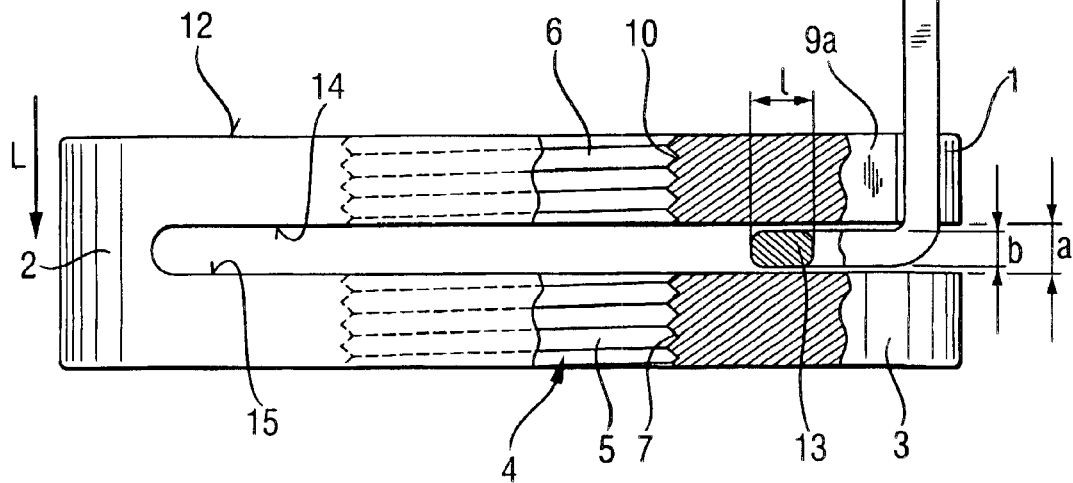
FIG. 3 shows the threaded element of FIG. 1 in the unlocked state.

FIGS. 1 to 3 show a self-locking threaded element, according to the invention, comprising a substantially cylindrical nut element with a retaining member 1 and a main part 3 disposed axially spaced relative to the retaining member 1 and connected with the retaining member 1 by a connection web 2. The main part 3 and retaining member 1 are interspersed with a thread 4, in particular an inner thread. The retaining member 1 is displaceable, in the longitudinal direction L of the thread 4, relative to the main part 3.

The main part 3 comprises a substantially circular cross-section and an approximately centerally disposed through bore 5 with a first inner thread 7. The retaining member 1 comprises a circular cross-section whose diameter corresponds to approximately the diameter of the main part 3. Further, the retaining member 1 comprises a centrally disposed through bore 6 with a second inner thread 10 that runs coaxially with the first inner thread 7. The connection web 2 connects the main part and the retaining member 1 radially in a radially outer zone of the retaining member 1 and the main part 3.

An expansion element 8 is provided diametrically from the connection web 2 for pivoting the retaining member 1 relative to the main part 3. The expansion element 8 is pivotally mounted between the main part 3 and the retaining member 1 through two recesses 9a, 9b, which are arranged on the retaining member 1. The expansion element 8 comprises a non-round, in particular a rectangular cross-section, expansion part 13. Further, the lever-like configured expansion element 8 exhibits a U-shaped actuation part 11 that forms a single unit with the expansion part 13.

FIGS. 1 and 2 represent the threaded element in the locked state. The disk-like actuation part 11 abuts on the front side 12 facing outwards of the retaining member 1 and at right angles thereto. The expansion part 13 extends between the two inner front surfaces 14, 15 of the retaining member 1 and the main part 3. The expansion part 13 comprises a rectangular cross-section with a length l and a width b oriented such that, in the locked state, the length l runs parallel to the longitudinal axis L of the thread, in particular to the first and second inner thread 7, 10. The retaining member 1 in the area of the expansion member 13 pivots relative to the main part 3 since the length of the cross-section of the expansion part 13 is greater than the distance a, of the retaining member 1 to the main part 3. This displacement of the two parts, in particular the two inner threads 7, 10 results in a clamping of the counter-thread (not represented herein) in the thread 4 and thereby results in a locking of the threaded element, in particular the nut element.

FIG. 3 represents the threaded element in the unlocked state. The threaded element is translated into the unlocked state by a pivoting of the expansion element 8 represented in FIGS. 1 and 2 into a release direction F by 90° about the longitudinal axis of the expansion part 13. In the unlocked state of the threaded element, the expansion part 13 is oriented such that the width b runs parallel to the longitudinal direction L of the thread, in particular, to the first and second inner thread 7, 10. The retaining member 1 runs parallel to the main part 3 at a distance a since the width b of the cross-section of the expansion part 13 is smaller than the space a of the retaining member 1 to the main part 3. As a result, no wedging of the counter-thread occurs.

The retaining member 1 and the connection web 2 are pieced together as a single unit to assure the inexpensive manufacture of the threaded element the main part 3.

What is claimed is:

1. A self-locking threaded element comprising a retaining member (1), a main part (3) axially disposed relative to the retaining member (1) at a distance (a) and connected with the retaining member (1) by a connection web (2), and an expansion element (8) for pivoting the retaining member (1) relative to the main part (3), wherein the main part (3) and the retaining member (1) are interspersed with a thread (4) for engaging a counter-thread, wherein the retaining member (1) is displaceable relative to the main part (3) at least in a longitudinal direction (L) of the thread (4);

wherein the retaining member (1) is pivotable at least in the longitudinal direction (L) of the thread (4) relative to the main part (3), wherein the expansion element (8) comprises an actuation part (11) that is not disposed between the main part (3) and the retaining member (1), and a non-round expansion part (13) disposed at least partially between the main part (3) and the retaining member (1) and wherein the expansion element (8) is movable between locked and unlocked positions and the non-round expansion part (13) has a longitudinal axis running transverse to the longitudinal direction (L) of the thread (4) and further has a cross-section having a length (l) such that, in the locked position, the length (l) runs parallel to the longitudinal axis (L) of the thread and in the unlocked position, the length (l) runs perpendicular to the longitudinal axis (L) of the threads.

2. The threaded element of claim 1, wherein the expansion part (13) comprises a non-round cross-section.

3. The threaded element of claim 2, wherein the expansion element (8) comprises an actuation part (11) for rotating the expansion part (13).

4. The threaded element according of claim 1, wherein the main part (3), the retaining member (1) and the connection web (2) form a single unit.

* * * * *